(12) United States Patent
Son

(10) Patent No.: US 11,651,917 B2
(45) Date of Patent: May 16, 2023

(54) ELECTRODE DRIVING DEVICE FOR GAS INSULATED SWITCHGEAR

(71) Applicant: HYOSUNG HEAVY INDUSTRIES CORPORATION, Seoul (KR)

(72) Inventor: Sung Hyup Son, Changwon-si Gyeongsangnam-do (KR)

(73) Assignee: HYOSUNG HEAVY INDUSTRIES CORPORATION, Seoul (KR)

(*) Notice: Subject to any disclaimer, the term of this patent is extended or adjusted under 35 U.S.C. 154(b) by 0 days.

(21) Appl. No.: 17/420,543

(22) PCT Filed: Dec. 30, 2019

(86) PCT No.: PCT/KR2019/018750
§ 371 (c)(1),
(2) Date: Jul. 2, 2021

(87) PCT Pub. No.: WO2020/141840
PCT Pub. Date: Jul. 9, 2020

(65) Prior Publication Data
US 2022/0076908 A1 Mar. 10, 2022

(30) Foreign Application Priority Data
Jan. 4, 2019 (KR) .......................... 10-2019-0001104

(51) Int. Cl.
*H01H 33/42* (2006.01)
*H02B 13/045* (2006.01)

(52) U.S. Cl.
CPC .......... *H01H 33/42* (2013.01); *H02B 13/045* (2013.01)

(58) Field of Classification Search
CPC .... H01H 33/42; H01H 33/122; H02B 13/045; H02B 13/035; H02B 13/075
(Continued)

(56) References Cited

U.S. PATENT DOCUMENTS 3,553,410 A * 1/1971 Morva ................... H01H 33/02
200/48 R
4,107,498 A * 8/1978 Golota ..................... H01H 3/40
218/80
(Continued)

FOREIGN PATENT DOCUMENTS

JP 07-037470 A 2/1995
JP 9-063425 A 3/1997
(Continued)

OTHER PUBLICATIONS

Translation of JPH07377470 (Original document published Feb. 7, 1995) (Year: 1995).*
(Continued)

*Primary Examiner* — William A Bolton
(74) *Attorney, Agent, or Firm* — Novick, Kim & Lee PLLC; Jae Youn Kim

(57) ABSTRACT

A movable electrode driving device for a gas insulated switchgear is proposed. A movable electrode may be installed at one of conductors installed in an enclosure inner space of an enclosure. The movable electrode may move into and out of the conductor. Power for driving the movable electrode may be transmitted from a manipulator. A rotation manipulation lever may be installed at the outside of the enclosure, and an insulated shaft may be located inside the enclosure, the insulated shaft being connected to the rotation manipulation lever and extending into the conductor. A rotary lever may be located inside the conductor by being connected to the insulated shaft, and a transmission lever driven by the rotary lever so as to move the movable electrode may be provided.

7 Claims, 6 Drawing Sheets

(58) Field of Classification Search
USPC .......... 200/48 R, 48 A, 50.34, 50.38, 50.39; 218/12, 13, 45, 55, 57
See application file for complete search history.

(56) References Cited

U.S. PATENT DOCUMENTS

| | | | | |
|---|---|---|---|---|
| 4,413,166 A | * | 11/1983 | Meyer | H01H 31/32 218/80 |
| 5,382,765 A | * | 1/1995 | Lorenz | H02B 13/075 200/50.08 |
| 8,106,326 B2 | * | 1/2012 | Nakauchi | H01H 31/003 218/55 |
| 8,885,327 B2 | * | 11/2014 | Kawahigashi | H01H 33/42 361/612 |
| 2009/0045170 A1 | * | 2/2009 | Shimizu | H01H 31/003 218/62 |

FOREIGN PATENT DOCUMENTS

| | | | |
|---|---|---|---|
| JP | 11-086690 A | | 3/1999 |
| JP | 2007-524336 A | | 8/2007 |
| JP | 5735123 B2 | | 6/2015 |
| KR | 10-1990-0001965 B1 | | 3/1990 |
| KR | 10-0764067 B1 | | 10/2007 |
| KR | 10-2009-0009778 A | | 1/2009 |
| KR | 20150002591 | * 7/2015 | ............. H01H 33/42 |
| WO | 2013-157360 A1 | | 10/2013 |

OTHER PUBLICATIONS

Translation of KR20150002591 (Original document published Jul. 2, 2015) (Year: 2015).*

* cited by examiner

ELECTRODE DRIVING DEVICE FOR GAS INSULATED SWITCHGEAR

TECHNICAL FIELD

The present disclosure relates generally to a gas insulated switchgear. More particularly, the present disclosure relates to an electrode driving device for a gas insulated switchgear which operates a movable electrode used in the gas insulated switchgear.

BACKGROUND ART

Due to rapid increase in power demand due to industrial development and urbanization, a power system having a large capacity and an ultra-high voltage is required. Accordingly, the stabilization and reliability improvement of a power facility are emerging as very important issues. Due to the rapid increase in power demand, in an ultra-high voltage substation facility, a main circuit system is being sealed and concealed, and a control system is becoming electronic due to difficulty in securing a facility site, excessive maintenance costs, and the securement of safety. According to this trend, the existing air or oil insulated substation facility is being replaced with a gas insulated substation facility.

A gas insulated switchgear (GIS) has a circuit breaker, a disconnector, and a grounding switchgear integrated with each other as a unit, so the maintenance of the gas insulated switchgear can be efficiently performed and the occupied volume thereof can be minimized. Recently, due to rapid increase in demand of the gas insulated switchgear, a technology in a field related thereto is being very actively developed.

In a disconnector of the conventional gas insulated switchgear, to operate a movable electrode, power of a manipulator is transmitted to the movable electrode by the rotation of a lever located outside an enclosure such that the power causes the rectilinear movement of an insulated rod extending to the inside of the enclosure so as to generate the rectilinear movement of the movable electrode.

Due to the characteristics of such a structure, a structure in which the rectilinear movement of the insulated rod is generated by the power of the manipulator located outside the enclosure is installed. Accordingly, parts located outside the enclosure constituting the gas insulated switchgear are installed, so there was a problem in that area and volume for the installation of the gas insulated switchgear were relatively large.

In addition, the movement of the insulated rod is transmitted directly to the movable electrode, and the rectilinear movement of the movable electrode is performed. Accordingly, the insulated rod is installed in the same direction as the moving direction of the movable electrode, so a line cannot be set in the moving direction of the movable electrode, but extends only in a direction orthogonal to the moving direction of the movable electrode.

DISCLOSURE

Technical Problem

The present disclosure has been made keeping in mind the above problems occurring in the prior art, and the present disclosure is intended to propose an electrode driving device for a gas insulated switchgear in which a power transmission structure for the operation of a movable electrode may be located in an enclosure.

In addition, the present disclosure is intended to propose an electrode driving device for a gas insulated switchgear in which a power transmission structure for the operation of the movable electrode may be located in a conductor located inside the enclosure.

Furthermore, the present disclosure is intended to propose an electrode driving device for a gas insulated switchgear in which the insulation characteristics of an insulated shaft transmitting a driving force to the movable electrode are improved.

Technical Solution

In order to accomplish the above objectives, according to an aspect of the present disclosure, the present disclosure provides a movable electrode driving device for a gas insulated switchgear, the driving device installed in an enclosure and driving a movable electrode configured to electrically connect conductors to each other constituting a line between the conductors, the driving device including: an insulated shaft rotated by a driving force transmission member operated by a driving force of a manipulator located outside the enclosure, the insulated shaft extending to an inside of the conductor located inside the enclosure, and a transmission mechanism driven by the insulated shaft and configured to transmit a driving force of the insulated shaft to the movable electrode such that the movable electrode moves into and out of the conductor, the transmission mechanism being installed in a conductor inner space defined in the conductor.

The conductor may be configured to have a curved surface at an outer surface thereof and may have the conductor inner space defined therein, wherein an electrode through hole may be formed at an end part of the conductor in a longitudinal direction thereof such that the movable electrode enters and exits the conductor, and a shaft through hole may be formed at a side of the outer surface of the conductor in a direction orthogonal to an open direction of the electrode through hole such that the insulated shaft passes through the shaft through hole.

The transmission mechanism may include: an electrode guiding pin guiding a rectilinear movement of the movable electrode; a rotary lever rotated relative to the insulated shaft by the insulated shaft; a transmission lever connected to an end of the rotary lever by the interlocking shaft so as to rotate relative to the rotary lever and connected to the movable electrode by an electrode connecting shaft so as to rotate relative to the movable electrode such that the movable electrode is moved; and a guide allowing a guide pin located at an end part of the transmission lever to be rectilinearly moved in the direction orthogonal to a moving direction of the movable electrode.

An electrode inner space may be defined in the movable electrode and the electrode guiding pin may be located in the electrode inner space such that the movable electrode rectilinearly moves.

In the conductor in which the transmission mechanism is installed, a connection conductor may be connected to an end part of the conductor in a longitudinal direction thereof or to a side of the outer surface of the conductor to form a line.

A guide channel may be defined in the guide such that the guide pin is guided by the guide channel, and the guide may be installed at a guide cover constituting a portion of the outer surface of the conductor.

The insulated shaft may be made of an epoxy.

The insulated shaft may have multiple insulated blades formed by surrounding a cylindrically-shaped outer surface thereof.

Advantageous Effects

The electrode driving device of the gas insulated switchgear according to the present disclosure may obtain the following effects.

In the present disclosure, the changing of the rotational movement of an insulated shaft to the rectilinear movement of a movable electrode by power transmitted from a manipulator may be performed inside an enclosure instead of the outside of the enclosure, thereby reducing space required for the outside of the enclosure and reducing space required for the installation of the gas insulated switchgear.

In addition, a structure in which a rotational movement is changed to a rectilinear movement by power transmitted from the manipulator may be located in a conductor installed in the enclosure, so the conductor may function as a shield structure for the power transmission structure, thereby making a separate part for the shield structure unnecessary and reducing an overall cost.

Furthermore, in the present disclosure, an insulated shaft transmitting a driving force of the manipulator located outside the enclosure to the inside of the conductor located inside the enclosure may be made of an epoxy material having a relatively high dielectric constant, and multiple insulated blades may be provided on the outer surface of the insulated shaft to increase a surface area thereof such that an electric field is reduced per unit area of the insulated shaft, thereby improving the insulation performance of the insulated shaft.

MODE FOR INVENTION

Figure 1:
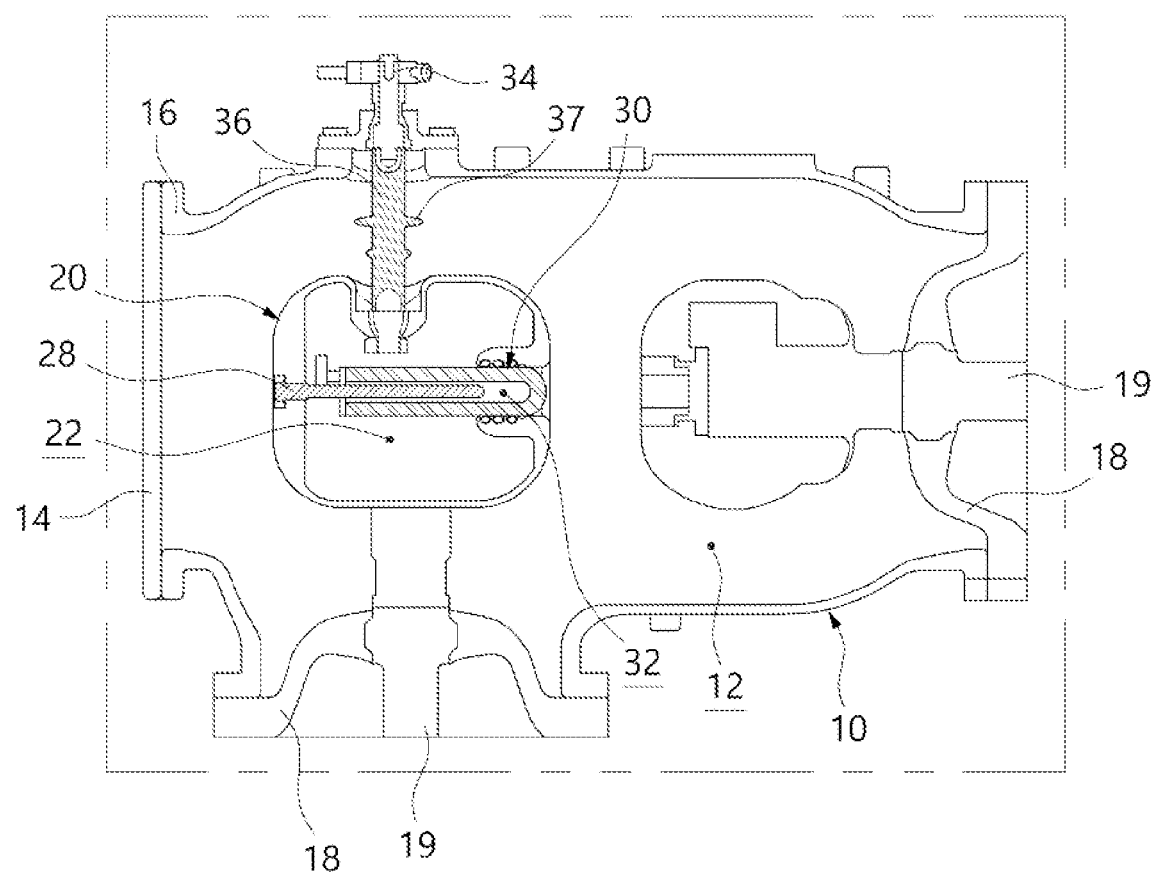
FIG. 1 is a sectional view illustrating the configuration of an important part of a gas insulated switchgear in which an exemplary embodiment of an electrode driving device of the present disclosure is made.

Hereinafter, an embodiment of the present disclosure will be described in detail with reference to the accompanying drawings. In giving reference numerals to components of each drawing, it should be noted that the same components are given the same reference numerals as many as possible although they are indicated on different drawings. In addition, in describing the embodiment of the present disclosure, if it is determined that a detailed description of a related known configuration or function interferes with the understanding of the embodiment of the present disclosure, the detailed description thereof will be omitted.

In addition, in describing the components of an actuator of the present disclosure according to the embodiment, terms such as first, second, A, B, (a), (b), etc. may be used. These terms are only for distinguishing the components from other components, and the essence or order of the components are not limited by the terms. When it is described that a component is "connected", "coupled", or "bonded" to another component, it should be understood that the component may be directly connected or bonded to the other component, but another component may be provided between each component to be connected or bonded thereto.

In FIG. 1, the configuration of an important part of the gas insulated switchgear is illustrated. A predetermined enclosure inner space 12 may be defined in an enclosure 10 constituting the exterior of the gas insulated switchgear. The enclosure inner space 12 may be filled with gas, and several parts constituting the gas insulated switchgear may be installed in the enclosure inner space 12.

Multiple connection holes 14 may be formed in the enclosure 10. The connection hole 14 may be intended to connect the enclosure 10 to an adjacent enclosure 10. Parts for external manipulation may be installed at the connection hole 14. A connection flange 16 may be provided by surrounding an edge of the connection hole 14 such that the adjacent enclosure 10 or the parts for external manipulation are installed at the connection flange 16. A spacer 18 may be installed at a portion of the connection hole 14 to electrically connect conductors 20 to each other located in the enclosures 10 adjacent to each other. A connection conductor 19 may be provided at the center of the spacer 18 by passing therethrough and may electrically connect the conductors 20 to each other to be described later to form a line.

The conductor 20 may be installed in the enclosure inner space 12 to form a line. The conductor 20 may have a conductor inner space 22 defined therein. The conductor 20 may be shaped to have a curved outer surface such that there are no protruding or angled parts on the outer surface. The conductor 20 may have a cylindrical shape having an empty inside, and opposite end parts thereof may be configured to be curved without angled or protruding parts.

When a guide cover constituting a portion of the outer surface of the conductor 20 is removed from the outer surface of the conductor, the conductor inner space 22 may communicate with the outside of the conductor. An electrode through hole 24 may be formed at a side of the conductor inner space 22. The electrode through hole 24 may be formed at a center of an end part of a side of the conductor 20 in the longitudinal direction thereof. The electrode through hole 24 may be a part through which a movable electrode 30 to be described later passes to move into and out of the conductor 20. Multiple contact elastic members 25 may be installed on the inner surface of the electrode through hole 24 and may allow electrical connection between the movable electrode 30 and the conductor 20 to be efficiently performed. A wear ring 26 may also be installed on the inner surface of the electrode through hole 24. The wear ring 26 may be generally made of a Teflon material and serve to minimize metal contact between the conductor 20 and the movable electrode 30.

A shaft through hole 24' may be formed at a second side of the outer surface of the conductor 20. The shaft through hole 24' is a part through which an insulated shaft 36 to be described later passes. A part in which the shaft through hole 24' is formed may be a side of the outer surface of the conductor 20. The open direction of the shaft through hole 24' may be orthogonal to the open direction of the electrode through hole 24. This means that the extending direction of the insulated shaft 36 and the extending direction of the movable electrode 30 are orthogonal to each other.

An electrode guiding pin 28 may be installed to be long in the longitudinal direction of the conductor inner space 22 of the conductor 20. The electrode guiding pin 28 may be formed shorter than the length of the conductor 20 and may guide the movement of the movable electrode 30 to be described later in the conductor inner space 22.

The movable electrode 30 may be installed in the conductor inner space 22 of the conductor 20 and may move into and out of the conductor 20 through the electrode through hole 24. As illustrated in FIG. 1, the movable electrode 30 may electrically be connected to and disconnected from a fixed electrode (no reference numeral) installed in another conductor adjacent to the conductor 20. That is, the movable electrode 30 may protrude from the inside of the conductor 20 and be electrically connected to the fixed electrode, and may move into the conductor 20 and be electrically disconnected from the fixed electrode. An electrode inner space 32 may be defined inside the movable electrode 30. The electrode guiding pin 28 may be located in the electrode inner space 32 such that the movable electrode 30 moves in the longitudinal direction of the electrode guiding pin 28. The electrode inner space 32 may be open at a rear end of the movable electrode 30.

Next, a configuration in which a driving force is transmitted for the movement of the movable electrode 30 will be described. A rotation manipulation lever 34 operated by the driving force of a manipulator may be located outside the enclosure 10. The rotation manipulation lever 34 may be rotated by the driving force of the manipulator.

The insulated shaft 36 may be installed such that the insulated shaft 36 is connected to the rotation manipulation lever 34 and extends to the conductor inner space 22 of the conductor 20 by passing through the enclosure 10 and the conductor 20. A material of which the insulated shaft 36 is made may be an epoxy. The insulated shaft 36 is made of an epoxy and thus may have a higher insulation performance than an existing insulated shaft made of an FRP material. The insulated shaft 36 may function to realize insulation between the rotation manipulation lever 34 located outside the enclosure 10, the conductor 20, and a rotary lever 38 located in the conductor 20 and to transmit power to the movable electrode. A first end of the insulated shaft 36 may be connected to the rotation manipulation lever 34 such that the insulated shaft 36 receives a rotational force from the rotation manipulation lever 34, and a second end of the insulated shaft may be connected to the rotary lever 38 installed in the conductor 20.

The insulated shaft 36 may be made to have a cylindrical shape, and multiple insulated blades 37 may be formed on the surface of the insulated shaft 36. As illustrated in FIG. 1, each of the insulated blades 37 may protrude by a predetermined length from the outer surface of the insulated shaft 36 by surrounding the outer surface thereof. The insulated blade 37 may be ring-shaped and may be formed by surrounding the outer surface of the insulated shaft 36. Such an insulated blade 37 may function to increase the entire surface area of the insulated shaft 36, thereby reducing an electric field per unit length of the insulated shaft 36 and improving insulation performance thereof. Of course, an epoxy, which is a material of the insulated shaft 36, may have dielectric constant that is at least twice dielectric constant of FRP, so the insulation performance of the insulated shaft 36 may be relatively improved.

The rotary lever 38 may be connected to the second end of the insulated shaft 36. The rotary lever 38 may rotate relative to the insulated shaft 36. The rotary lever 38 may have a rotation angle of 90 degrees or less. The rotary lever 38 may rotate relative to a first end part of the rotary lever 38 connected to the insulated shaft 36 and a second end part of the rotary lever 38 may move while drawing a circular trajectory.

A transmission lever 42 may be connected to the rotary lever 38 by an interlocking shaft 40. The transmission lever 42 may rotate relative to the interlocking shaft 40. A middle portion of the transmission lever 42 may be connected to the rotary lever 38 by the interlocking shaft 40. A first end part of the transmission lever 42 may be connected to the movable electrode 30 by an electrode connecting shaft 44 such that the transmission lever 42 is rotatable relative to the movable electrode 30. The first end part of the transmission lever 42 may be connected to the movable electrode 30 such that the transmission lever 42 rotates relative to the movable electrode 30 relative to the electrode connecting shaft 44. The guide pin 46 may be provided at a second end part of the transmission lever 42. The guide pin 46 may rectilinearly move along a guide channel 49 of a guide 48 to be described later. The direction of the rectilinear movement of the guide pin 46 may be a direction orthogonal to the moving direction of the movable electrode 30. The guide pin 46 may have a cylindrical shape, which is intended to reduce friction by minimizing a contact area of the guide pin 46 with the guide channel 49 to be described later. A roller may be mounted to the guide pin 46 such that the guide pin 46 moves more efficiently in the guide channel 49.

The guide 48 guiding the movement of the guide pin 46 of the transmission lever 42 may be fixed to the inside of the conductor 20. The guide channel 49 may be formed in the guide 48 and the guide pin 46 may rectilinearly move along the guide channel 49. The guide 48 may be connected to the guide cover 50, and the guide cover 50 may constitute a portion of the outer surface of the conductor 20. The guide 48 may be removed from the conductor 20 by removing the guide cover 50 from the conductor 20.

Hereinafter, the operation of an electrode driving device having the above configuration for a gas insulated switchgear according to the present disclosure will be described in detail.

In the illustrated embodiment, the movable electrode 30 used in a disconnector of the gas insulated switchgear is illustrated. The movable electrode 30 may be electrically connected to the fixed electrode of a conductor installed in the enclosure 10 and may connect the conductors 20 to each other constituting a line therebetween. When necessary, the fixed electrode and the movable electrode 30 may be separated from each other to cut the line.

To this end, the movable electrode 30 may be required to move into and out of the conductor 20, and may receive the driving force from the manipulator when necessary. The driving force of the manipulator may rotate the rotation manipulation lever 34. When the rotation manipulation lever 34 rotates, the insulated shaft 36 may rotate together with the rotation manipulation lever 34.

The rotation of the insulated shaft 36 may cause the interlocking shaft 40 of the rotary lever 38 located in the conductor 20 to be rotated by a predetermined angle. The transmission lever 42 may be operated by the rotation of the interlocking shaft 40 by the predetermined angle. The transmission lever 42 may move the movable electrode 30 while the electrode connecting shaft 44 rotates relative to the movable electrode 30, and the guide pin 46 may move along the guide channel 49 of the guide 48 in a direction orthogonal to the moving direction of the movable electrode 30. While the movable electrode 30 is rectilinearly moved by the operation of the transmission lever 42, the movable electrode 30 may be coupled to and decoupled from the fixed electrode.

Figure 4:
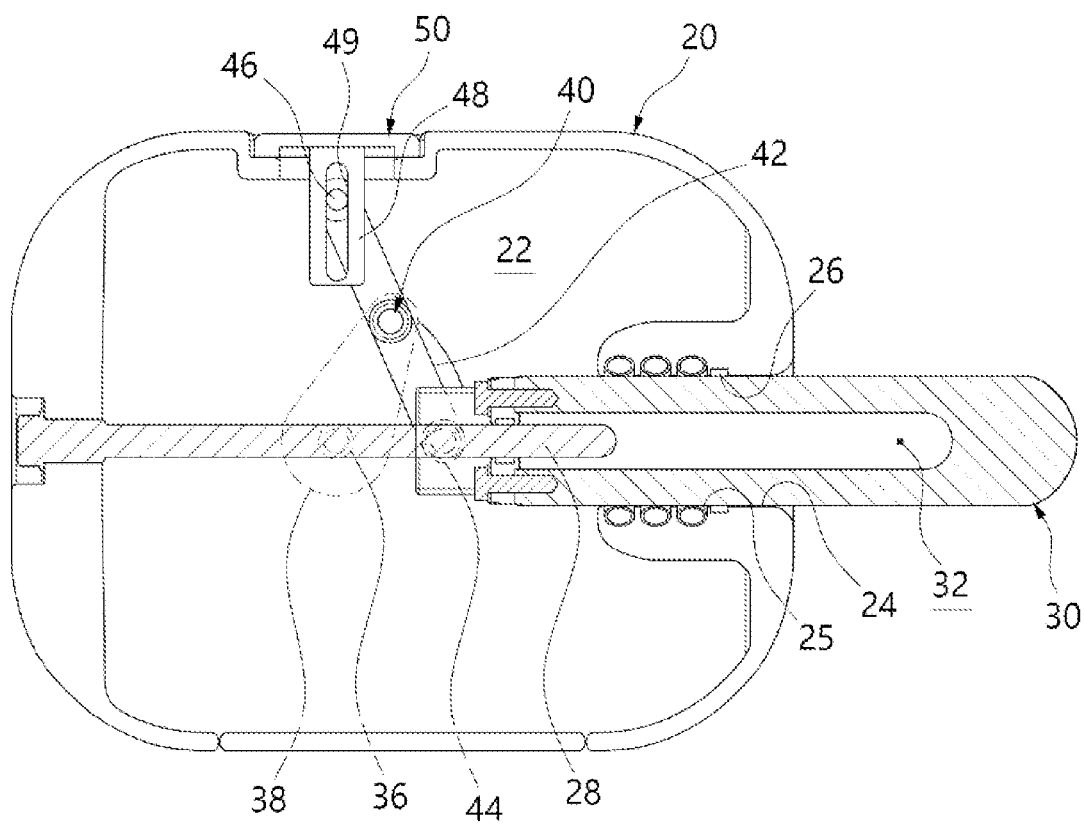
FIG. 4 is an operation view illustrating a state in which the movable electrode can be electrically connected to a fixed electrode by moving the movable electrode forward in the embodiment of the present disclosure.

In FIG. 4, the movable electrode 30 is illustrated to protrude to the outside of the conductor 20 such that the movable electrode 30 is coupled to the fixed electrode of an adjacent conductor 20. When an emergency situation occurs in a state in which the movable electrode 30 is coupled to the fixed electrode and the line is connected, a manipulation signal may be generated by the manipulator, and the rotation manipulation lever 34 may be rotated by a driving force generated from the manipulator. The rotation manipulation lever 34 may rotate the insulated shaft 36, and when the insulated shaft 36 is rotated counterclockwise relative to FIG. 4 by the rotation manipulation lever 34, the interlocking shaft 40 of the rotary lever 38 may also move counterclockwise while drawing a circular trajectory.

Figure 5:
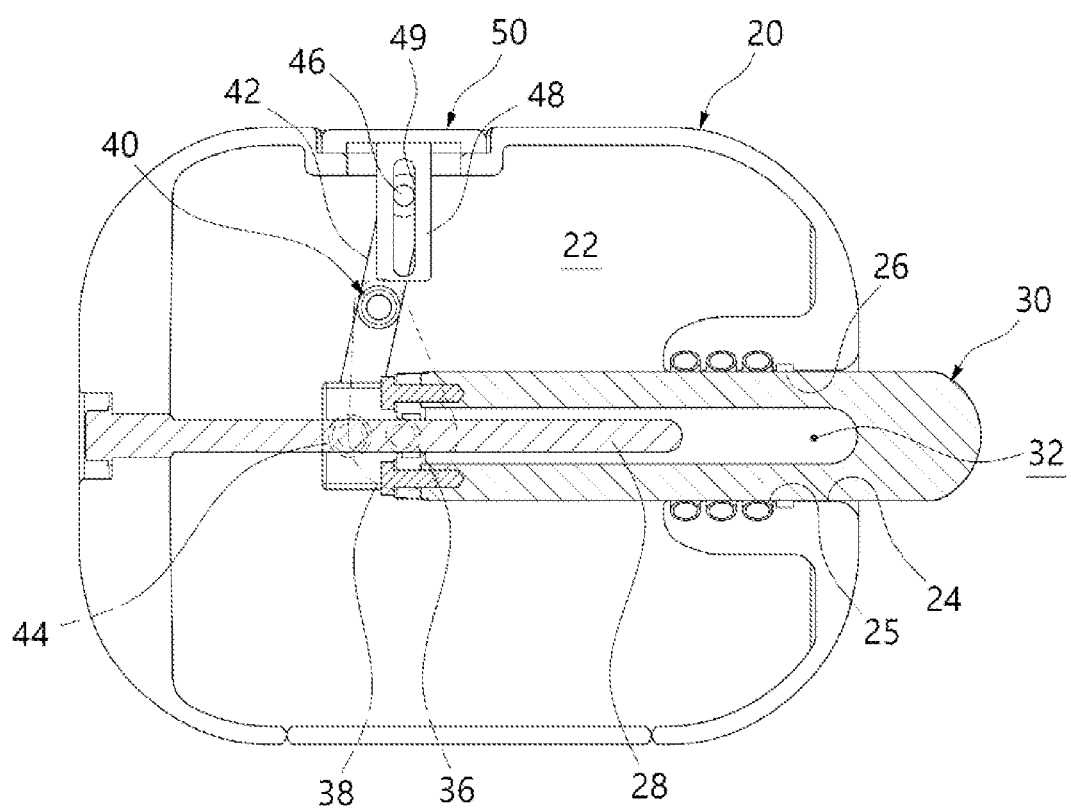
FIG. 5 is an operation view illustrating a process in which the rectilinear movement of the movable electrode is performed in the embodiment of the present disclosure.

When the interlocking shaft 40 moves while drawing a circular trajectory, the transmission lever 42 may move. The guide pin 46 of the transmission lever 42 may rectilinearly move downward along the guide channel 49 relative to FIG. 4, and the electrode connecting shaft 44 may pull the movable electrode 30 to the left relative to the drawing. Due to such a movement, the movable electrode 30 may move into the conductor inner space 22 of the conductor 20. The movement of the movable electrode 30 may be guided by the electrode guiding pin 28, so the rectilinear movement of the movable electrode 30 may be performed. Here, the transmission lever 42 may move to the left relative to the drawing while rotating clockwise relative to the interlocking shaft 40. Such an operation state is illustrated in FIG. 5, in which the movable electrode 30 is illustrated to move halfway.

Figure 2:
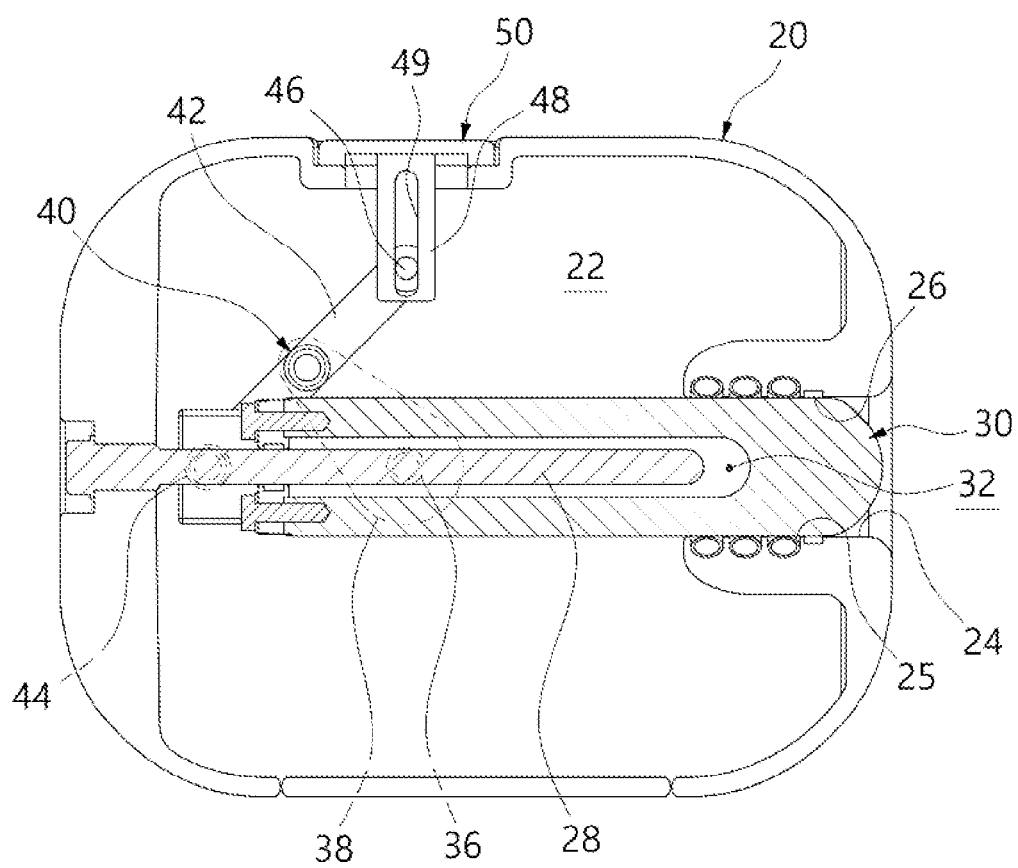
FIG. 2 is a sectional view illustrating the configuration of an important part of the electrode driving device according to the embodiment of the present disclosure.
Figure 3:
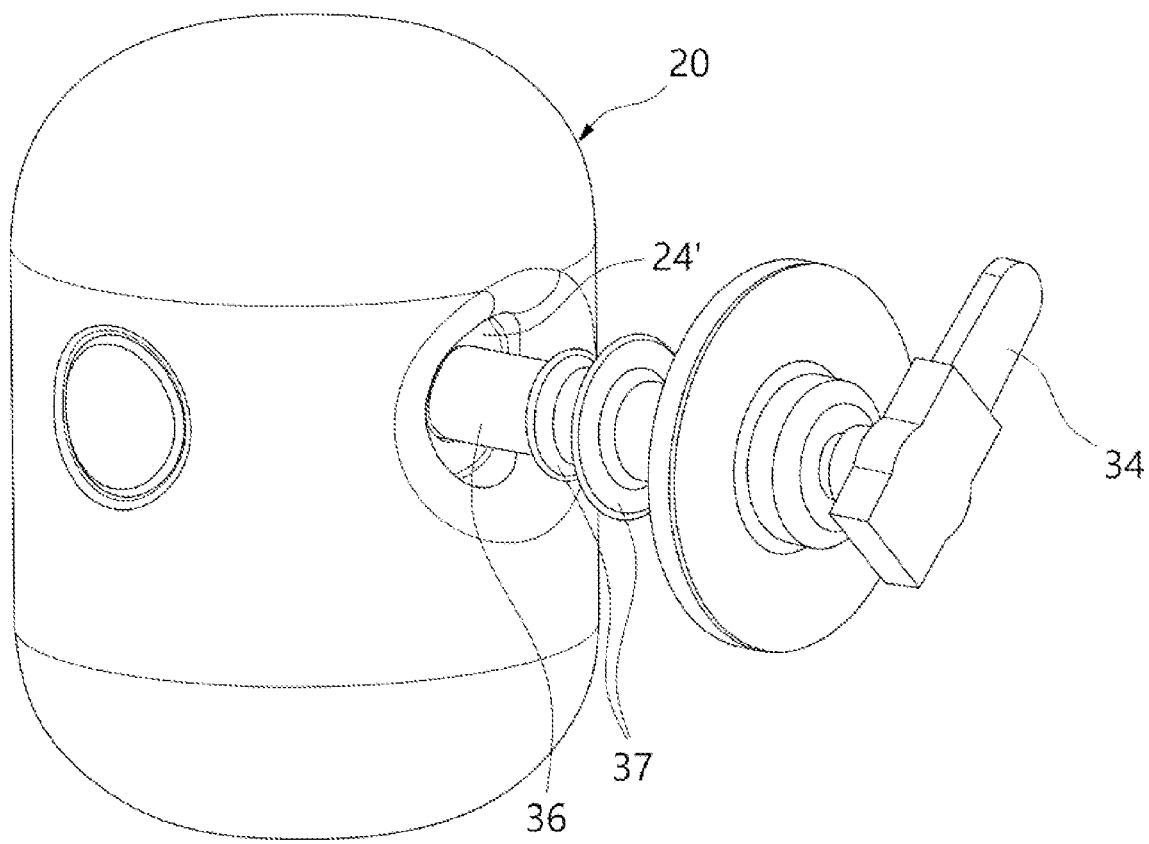
FIG. 3 is a perspective view illustrating parts enabling a rectilinear movement of a movable electrode in the embodiment of the present disclosure.

A state in which the movable electrode 30 is rectilinearly moved by the transmission lever 42 and is received into the conductor inner space 22 is illustrated in FIG. 2. The movable electrode 30 may be received in the conductor inner space 22 of the conductor 20, and a front end of the movable electrode 30 may also be located in the electrode through hole 24, so the movable electrode 30 may be in a state in which the movable electrode 30 does not protrude to the outside of the conductor 20. In such a state, electrical connection between the movable electrode 30 and a fixed electrode of an adjacent conductor is cut, so the connection of a line is cut.

Meanwhile, for the connection of the line of the gas insulated switchgear, the driving force of the manipulator in a direction opposite to the direction of the earlier driving force may be transmitted to the rotation manipulation lever 34, and the rotational force of the rotation manipulation lever 34 may be transmitted to the insulated shaft 36, so the rotary lever 38 may rotate clockwise relative to FIG. 2. When the rotary lever 38 rotates clockwise, the interlocking shaft 40 of the rotary lever 38 may rotate clockwise while drawing a circular trajectory.

While the interlocking shaft 40 is moved by the rotation of the rotary lever 38, the movement of the transmission lever 42 may be performed. While the transmission lever 42 moves to the right relative to FIG. 2, the transmission lever 42 may rotate counterclockwise relative to the interlocking shaft 40. In this case, the guide pin 46 of the transmission lever 42 may rectilinearly move along the guide channel 49 of the guide 48. That is, the guide pin 46 may move to the upper part of the guide channel 49 from the lower part thereof relative to the drawing.

Due to such a movement, the electrode connecting shaft 44 of the transmission lever 42 may move the movable electrode 30 to the right relative to the drawing. The movement of the movable electrode 30 may cause the movable electrode 30 to protrude to the outside of the conductor 20 such that the movable electrode 30 moves to a state of the movable electrode 30 in FIG. 5 through a state of the movable electrode 30 in FIG. 4. When the movable electrode 30 is in the state of the movable electrode 30 in FIG. 5, the movable electrode 30 may be coupled to the fixed electrode so as to realize the connection of the line.

Figure 6:
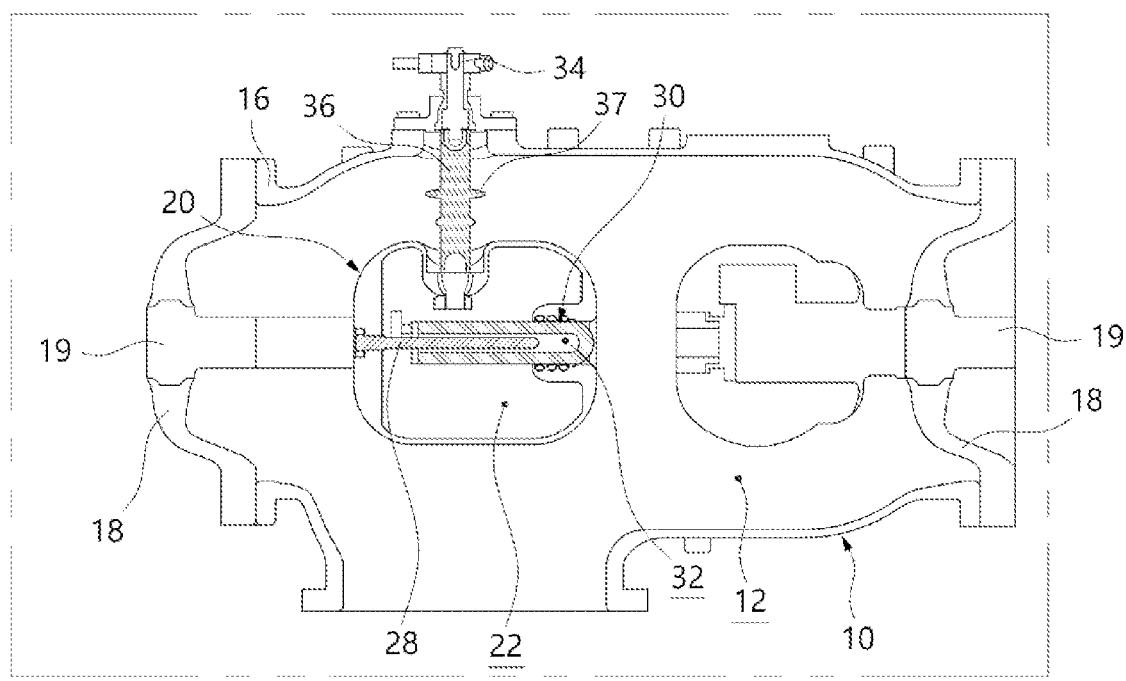
FIG. 6 is a sectional view illustrating a line formed in a straight line in the embodiment of the present disclosure.

Meanwhile, in FIG. 6, a line is illustrated to be formed in a straight line by the conductor 20 at which the movable electrode driving device of the present disclosure is installed. For reference, in FIG. 1, when the movable electrode driving device of the present disclosure is employed, a line is illustrated to be perpendicularly bent.

The formed shape of the line may depend on which part of the conductor 20 to which the connection conductor 19 of the spacer 18 adjacent to the conductor 20 at which the transmission lever 42 is installed is connected. In the conductor 20, when the connection conductor 19 is connected to a side opposite to a side at which the movable electrode 30 enters and exits the conductor 20, a line may be formed in a straight line. Furthermore, when the connection conductor 19 is configured to be connected to one side of the outer surface of the conductor 20, that is, when the connection conductor 19 is configured as illustrated in FIG. 1, a line may be formed by bending at a right angle. Accordingly, when the movable electrode driving device of the present disclosure is employed, the connection conductor 19 may be connected to the conductor 20 in various directions, so a line may be formed in a straight line or may be formed by bending at a right angle.

In the above, even if all the components constituting the actuator according the embodiment of the present disclosure are described as being integrally combined or being operated integrally in combination, the present disclosure is not necessarily limited to this embodiment. That is, within the scope of the objective of the present disclosure, all the components may operate in at least one selective combination. In addition, terms such as "include", "constitute", or "have" described above mean that the corresponding component may be inherent unless otherwise stated. Accordingly, the terms should not be construed as excluding other components, but as being able to further include other components. All terms including technical and scientific terms have the same meaning as commonly understood by those skilled in the art to which the present disclosure belongs, unless otherwise defined. Commonly used terms, such as terms defined in a dictionary, should be interpreted as being consistent with the contextual meaning of the related art, and are not interpreted in an ideal or excessively formal meaning unless explicitly defined in the present disclosure.

The above description is merely illustrative of the technical spirit of the present disclosure, and those skilled in the art to which the present disclosure pertains may make various modifications and variations without departing from the essential characteristics of the present disclosure. Accordingly, the embodiment disclosed in the present disclosure is for explaining rather than limiting the technical spirit of the present disclosure, and the scope of the technical spirit of the present disclosure is not limited to the embodiment. The protection scope of the present disclosure should be interpreted by the following claims, and all technical ideas within the scope equivalent thereto should be construed as being included in the scope of the present disclosure.

Meanwhile, in the embodiment illustrated in the drawings, the rotation manipulation lever 34 may be configured to rotate the insulated shaft 36 by power transmitted from the manipulator. However, the rotation manipulation lever 34 may not necessarily rotate the insulated shaft 36, but a driving force transmission member transmitting the driving force of the manipulator may rotate the insulated shaft 36.

In addition, parts such as the rotary lever 38, the transmission lever 42, and the guide 48 may be provided in the conductor 20, so the rotational movement of the insulated shaft 36 may be changed to the rectilinear movement of the movable electrode 30, but a transmission mechanism having various parts which changes the rotational movement of the insulated shaft 36 to the rectilinear movement of the movable electrode may be installed. That is, as the illustrated embodiment, multiple levers may be used, a lever and a gear may be used, or gears may be used so as to rectilinearly move the movable electrode 30.

The invention claimed is:

1. A driving device for a gas insulated switchgear, the driving device installed in an enclosure and driving a movable electrode configured to electrically connect conductors to each other constituting a line between the conductors, the driving device comprising:
   an insulated shaft rotated by a driving force transmission member operated by a driving force of a manipulator located outside the enclosure, the insulated shaft extending to an inside of the conductor located inside the enclosure, and
   a transmission mechanism driven by the insulated shaft and configured to transmit a driving force of the insulated shaft to the movable electrode such that the movable electrode moves into and out of the conductor, the transmission mechanism being installed in a conductor inner space defined in the conductor,
   wherein an electrode through hole is formed at an end part of the conductor in a longitudinal direction thereof such that the movable electrode enters and exits the conductor, and
   wherein the transmission mechanism comprises:
   an electrode guiding pin guiding a rectilinear movement of the movable electrode;
   a rotary lever rotated relative to the insulated shaft by the insulated shaft;
   a transmission lever connected to an end of the rotary lever by an interlocking shaft so as to rotate relative to the rotary lever and connected to the movable electrode by an electrode connecting shaft so as to rotate relative to the movable electrode such that the movable electrode is moved; and
   a guide allowing a guide pin located at an end part of the transmission lever to be rectilinearly moved in a direction orthogonal to a moving direction of the movable electrode.

2. The driving device of claim 1, wherein the conductor is configured to have a curved surface at an outer surface thereof and has the conductor inner space defined therein, and a shaft through hole is formed at a side of the outer surface of the conductor in a direction orthogonal to an open direction of the electrode through hole such that the insulated shaft passes through the shaft through hole.

3. The driving device of claim 1, wherein an electrode inner space is defined in the movable electrode and the electrode guiding pin is located in the electrode inner space such that the movable electrode rectilinearly moves.

4. The driving device of claim 3, wherein in the conductor in which the transmission mechanism is installed, a connection conductor is connected to an end part of the conductor in a longitudinal direction thereof or to a side of the outer surface of the conductor to form a line.

5. The driving device of claim 4, wherein a guide channel is defined in the guide such that the guide pin is guided by the guide channel, and the guide is installed at a guide cover constituting a portion of the outer surface of the conductor.

6. The driving device of claim 1, wherein the insulated shaft is made of an epoxy.

7. The driving device of claim 6, wherein the insulated shaft has multiple insulated blades formed by surrounding a cylindrically-shaped outer surface thereof.

* * * * *